United States Patent
Hay et al.

(10) Patent No.: US 11,579,920 B2
(45) Date of Patent: Feb. 14, 2023

(54) VIRTUAL PROCESSOR INTERRUPT TRACKING

(71) Applicant: Arm Limited, Cambridge (GB)

(72) Inventors: Timothy Nicholas Hay, Cambridge (GB); Nathan William Whitaker, Sawston (GB); Haralds Capkevics, Cambridge (GB)

(73) Assignee: Arm Limited, Cambridge (GB)

( * ) Notice: Subject to any disclaimer, the term of this patent is extended or adjusted under 35 U.S.C. 154(b) by 272 days.

(21) Appl. No.: 16/934,355

(22) Filed: Jul. 21, 2020

(65) Prior Publication Data

US 2022/0027191 A1    Jan. 27, 2022

(51) Int. Cl.
*G06F 9/48* (2006.01)
*G06F 9/455* (2018.01)
*G06F 9/50* (2006.01)

(52) U.S. Cl.
CPC ........ *G06F 9/4818* (2013.01); *G06F 9/45558* (2013.01); *G06F 9/5077* (2013.01); *G06F 9/45537* (2013.01); *G06F 2009/45575* (2013.01); *G06F 2009/45583* (2013.01); *G06F 2009/45591* (2013.01)

(58) Field of Classification Search
CPC .. G06F 9/4818; G06F 9/45558; G06F 9/5077; G06F 2009/45583; G06F 2009/45591; G06F 9/45537; G06F 2009/45575
See application file for complete search history.

(56) References Cited

U.S. PATENT DOCUMENTS

| | | | | |
|---|---|---|---|---|
| 6,112,274 A * | 8/2000 | Goe | ........................ | G06F 13/26 710/266 |
| 6,141,703 A * | 10/2000 | Ding | ....................... | G06F 13/24 710/16 |
| 6,272,585 B1 * | 8/2001 | Roobrouck | ............. | G06F 13/24 710/262 |
| 6,378,023 B1 * | 4/2002 | Christie | .................. | G06F 13/24 710/260 |
| 2010/0023666 A1 * | 1/2010 | Mansell | .................. | G06F 13/24 718/1 |

(Continued)

OTHER PUBLICATIONS

Lip-Min Kohr, "Enterprise Visualization with ARM CoreLink SMMU and ARM CoreLink GIC", ARM, Apr. 2017, 11 pages.

*Primary Examiner* — Michael W Ayers
(74) *Attorney, Agent, or Firm* — Nixon & Vanderhye P.C.

(57) ABSTRACT

An apparatus comprises an interrupt distributor to distribute virtual interrupts to one or more physical processors, each virtual interrupt to be handled by one of a plurality of virtual processors mappable to said one or more physical processors; and control circuitry to maintain virtual processor interrupt tracking information corresponding to a given virtual processor. The virtual processor interrupt tracking information includes a pending interrupt record tracking which types of virtual interrupts are pending for the given virtual processor, and separate from the pending interrupt record, a pending interrupt status indication indicating a pending interrupt status for the given virtual processor. The pending interrupt status indicates whether the number of pending virtual interrupts for the given virtual processor is zero.

19 Claims, 8 Drawing Sheets

(56) References Cited

U.S. PATENT DOCUMENTS

| | | | | |
|---|---|---|---|---|
| 2014/0229938 A1* | 8/2014 | Tsirkin | .................... | G06F 13/26 |
| | | | | 718/1 |
| 2014/0351471 A1* | 11/2014 | Jebson | .................. | G06F 9/4812 |
| | | | | 710/269 |
| 2018/0165120 A1* | 6/2018 | Prosch | ....................... | G06F 9/50 |
| 2021/0089482 A1* | 3/2021 | Zhao | .................... | G06F 15/7807 |
| 2021/0342172 A1* | 11/2021 | Tsirkin | ................ | G06F 9/45558 |

\* cited by examiner

VIRTUAL PROCESSOR INTERRUPT TRACKING

BACKGROUND

Technical Field

The present technique relates to the field of data processing. More particularly, it relates to handling virtual interrupts to be handled by a virtual processor.

Technical Background

Virtualisation allows multiple operating systems to run concurrently on the same piece of system hardware. Each operating system may run on a virtual processor (or virtual machine, VM) that operates under the impression of having exclusive access to the processors, peripherals, system memory and input/output devices of the system hardware, but which is actually sharing that hardware with other virtual processors. The physical hardware may include a number of physical processors which can be mapped to particular virtual processors. A given virtual processor may from time to time be moved from one physical processor to another. A given physical processor may at a given time have more than one virtual processor mapped to it, but may be executing instructions from a particular one of those virtual processors mapped to that physical processor. A virtual processor which is currently having instructions executed from it may be considered to be a resident virtual processor, while other virtual processors which are mapped to a given physical processor but which are not currently having their instructions executed may be considered non-resident virtual processors. Virtualisation can be particularly useful for the enterprise server application space, where one physical server comprising a number of physical processors can be configured to support many virtual machines, even as many as tens, hundreds or thousands of virtual machines. Such virtualised servers may provide services such as web hosting, cloud services, database and storage management for example.

SUMMARY

At least some examples provide an apparatus comprising: an interrupt distributor to distribute virtual interrupts to one or more physical processors, each virtual interrupt to be handled by one of a plurality of virtual processors mappable to said one or more physical processors; and control circuitry to maintain virtual processor interrupt tracking information corresponding to a given virtual processor, the virtual processor interrupt tracking information comprising: a pending interrupt record indicative of which types of virtual interrupts are pending for the given virtual processor; and separate from the pending interrupt record, a pending interrupt status indication indicative of a pending interrupt status for the given virtual processor, said pending interrupt status indicative of whether the number of pending virtual interrupts for the given virtual processor is zero.

At least some examples provide an apparatus comprising: means for distributing virtual interrupts to one or more physical processors, each virtual interrupt to be handled by one of a plurality of virtual processors mappable to said one or more physical processors; and means for maintaining virtual processor interrupt tracking information corresponding to a given virtual processor, the virtual processor interrupt tracking information comprising: a pending interrupt record indicative of which types of virtual interrupts are pending for the given virtual processor; and separate from the pending interrupt record, a pending interrupt status indication indicative of a pending interrupt status for the given virtual processor, said pending interrupt status indicative of whether the number of pending virtual interrupts for the given virtual processor is zero.

At least some examples provide a method comprising: distributing virtual interrupts to one or more physical processors, each virtual interrupt to be handled by one of a plurality of virtual processors mappable to said one or more physical processors; and maintaining virtual processor interrupt tracking information corresponding to a given virtual processor, the virtual processor interrupt tracking information comprising: a pending interrupt record indicative of which types of virtual interrupts are pending for the given virtual processor; and separate from the pending interrupt record, a pending interrupt status indication indicative of a pending interrupt status for the given virtual processor, said pending interrupt status indicative of whether the number of pending virtual interrupts for the given virtual processor is zero.

Further aspects, features and advantages of the present technique will be apparent from the following description of examples, which is to be read in conjunction with the accompanying drawings.

DESCRIPTION OF EXAMPLES

Figure 1:
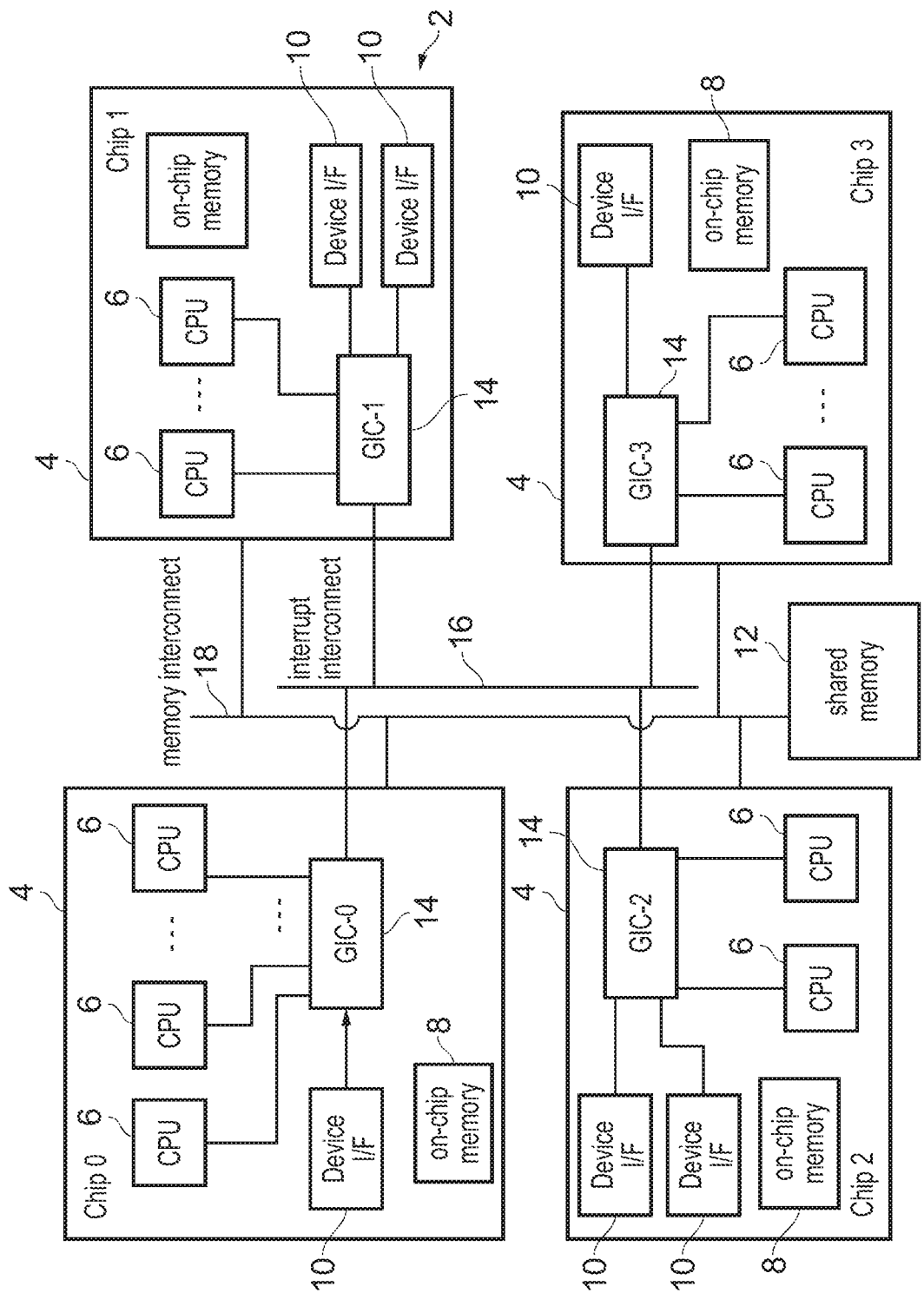
FIG. 1 schematically illustrates an example of a data processing system having a number of interrupt controllers which distribute interrupts to physical processors.

An apparatus may have one or more physical processors, which may support two or more virtual processors which can be mapped to the one or more physical processors. An interrupt distributor may be provided to distribute virtual interrupts to the respective physical processors. For example the interrupt distributor may consider mapping information which may specify the physical processor to which a given virtual processor is mapped. If, when a virtual interrupt is received targeting a particular virtual processor, that virtual processor is resident on a particular physical processor so that its instructions are being executed, then it is possible to route that virtual interrupt to the relevant physical processor so that it can be handled by the virtual processor targeted by the virtual interrupt.

However, sometimes a virtual interrupt may be received targeting a virtual processor which is currently non-resident, so that while it may be mapped to a particular physical processor, it is not currently being executed. Therefore, it may be desired to record some tracking information which tracks the pending interrupts that have been received for a particular virtual processor, so that when that virtual processor later becomes resident then that tracking information can be searched to identify the pending interrupts which should be delivered to the newly resident virtual processor, which can then handle those interrupts as if the virtual processor had been executing at the time the virtual interrupt was received. Hence, control circuitry may be provided to maintain virtual processor interrupt tracking information corresponding to a given virtual processor.

However, there may be a large number of types of virtual interrupts which could be received for a given virtual processor, so searching a pending interrupt record indicating which types of virtual interrupts are pending for a given virtual processor may take a relatively long time. This can increase the latency associated with changes of residency at a given physical processor, when a previously executing virtual processor is made non-resident and a newly executed virtual processor becomes resident so that a search of its pending interrupts may be performed. If the residency change operation is too slow then this may increase the downtime when a given physical processor is not able to carry out useful processing for any virtual processor. This may be a particular problem for cloud servers or other systems in the enterprise space where the number of different virtual processors may be very large in comparison to the number of physical processors so that changes of residency may be relatively frequent.

In the examples below, the control circuitry maintains virtual processor interrupt tracking information which comprises a pending interrupt record indicating which types of virtual interrupts are pending for a given virtual processor, and also comprises a pending interrupt status indication separate from the pending interrupt record. The pending interrupt status indication indicates a pending interrupt status for the given virtual processor. The pending interrupt status indicates at least whether the number of pending virtual interrupts for the given virtual processor is zero. By recording some status information tracking whether the number of pending virtual interrupts is zero, this can speed up residency changes by eliminating the need to search the pending interrupt record when it is known that there will be no pending virtual interrupts for the given virtual processor.

The apparatus may have interrupt search circuitry which performs an interrupt search in response to a search trigger event associated with the given virtual processor. The interrupt search may comprise searching the pending interrupt record to identify pending interrupts to be handled by the given virtual processor. This operation may be relatively slow as the pending interrupt record could for example be stored in a memory system which may have a certain latency to access and the interrupt search may in some examples require checking of a number of different cache lines in memory which record information about different types of virtual interrupts that could be pending. In response to the search trigger event, when the pending interrupt status indication indicates that the number of pending interrupts to be handled by the given virtual processor is zero, the interrupt search circuitry may suppress performing the interrupt search. Hence, the search trigger event could be responded to faster because it is not necessary to search through the pending interrupt record and so any memory access latency associated with searching the pending interrupt record can be eliminated. This improves performance.

In some examples, the pending interrupt status may indicate whether the number of pending virtual interrupts for a given virtual processor is zero, regardless of whether those pending virtual interrupts are enabled interrupts or disabled interrupts.

However, some systems may support interrupt masking, where mask information can be used to define certain types of interrupts as disabled and other types of interrupts as enabled, so that the disabled interrupts are types of interrupts which should not be delivered to the corresponding virtual processor. Hence, in some cases the pending interrupt status may indicate whether the number of enabled pending virtual interrupts for the given virtual processor is zero. For such an example, any disabled pending virtual interrupts do not affect whether the pending interrupt status indicates that the number of enabled pending virtual interrupts is zero for the given virtual processor. In some cases the interrupt search circuitry which performs the interrupt search may specifically be identifying enabled pending interrupts (as disabled pending interrupts do not need to be delivered), and so in response to the search trigger event, when the pending interrupt status indication indicates that the number of enabled pending interrupts to be handled by the given virtual processor is zero, the interrupt search may be suppressed, to avoid incurring the latency of searching when there are only disabled interrupts pending for the given virtual processor.

In other examples, the pending interrupt status may distinguish both whether there are any pending virtual interrupts for the given virtual processor at all (enabled or disabled), and whether there are any enabled pending virtual interrupts (even if there is still at least one disabled pending virtual interrupt, the status could still indicate the number of enabled pending virtual interrupts is zero). For example, the pending interrupt status indication could be a state indicator which takes different states depending on whether the pending interrupt record is completely empty of pending interrupts, or whether the pending interrupt record is populated but only with disabled pending interrupts, or whether there is at least one enabled pending interrupt. By providing different states depending on the presence of disabled or enabled interrupts then this can further improve the search time depending on whether the search is looking for all pending interrupts or only for enabled interrupts.

Hence, in some examples the pending status indication may indicate one of a number of states, and those states may include at least: a pending enabled state indicating that there is at least one enabled pending interrupt for the given virtual processor, and at least one further state indicating at least one of: that there are zero pending interrupts for the given virtual processor; and that one or more disabled interrupts are the only pending interrupts for the given virtual processor.

More generally, the pending interrupt status indication may indicate one of two or more states of a pending interrupt status state machine associated with a given virtual processor. The control circuitry may respond to events associated with a given virtual processor (such as receipt of a virtual interrupt targeting the given virtual processor, or the given virtual processor becoming resident) to trigger transitions between the states of the pending interrupt status state machine. The pending enabled state and the at least one further state described above may be some of the states of the state machine, but the state machine could also have other states.

For example, in one implementation the pending interrupt status could also be indicative of whether an interrupt search is ongoing for a given virtual processor. For example the state machine may include a searching state which indicates whether the interrupt search circuitry is partway through an interrupt search for the given virtual processor. In some implementations the state machine may also include a "searching (enabled interrupt received) state which indicates that an interrupt search is ongoing and at least one enabled pending interrupt has been received since the start of the search. These states can be useful for determining whether, on receipt of a further search trigger event, the search already ongoing will be sufficient to address the further search trigger event, or whether a further interrupt search should be carried out on completion of the current search. When an enabled pending interrupt is received for the given virtual processor while the pending status indication is in the "searching" state, the control circuitry may update the pending interrupt status indication to switch the current state to the "searching (enabled)" state.

This can be useful because it is possible that a further virtual interrupt could be received while an interrupt search is ongoing, and if the interrupt search has already checked the part of the pending interrupt record which corresponds to that type of interrupt, then that further virtual interrupt may not be detected in the interrupt search currently ongoing. Hence, a further search may be required if a further search trigger event occurs before the current search has finished. On the other hand, if no further enabled virtual interrupt has been received since the start of searching, then there may be no need to perform a further search in response to the further interrupt trigger event, as the search currently ongoing (started in response to an earlier interrupt search trigger event) may already be sufficient to deal with the further search trigger event if no enabled interrupts for the given virtual processor have been received since the start of the current search. Hence, the provision of "searching" and "searching (enabled) states can help to avoid, where possible, the latency of the interrupt search in cases where a further search trigger event occurs for a given virtual processor while a previous search is still ongoing and no further interrupt has been received since the start of that search.

An alternative approach to dealing with further interrupt search trigger events received while a previous search is ongoing could be to abort the current search in response to the further interrupt search trigger event, and restart the search so it can take account of any recently received virtual interrupt received after the start of the previous search. However, the inventors recognised that simply aborting the interrupt search when another interrupt search trigger event occurs could risk denial of service of certain types of interrupts, so that some interrupts remain pending indefinitely and are rarely handled, which could be a problem for some applications running within the given virtual processor. For example, the interrupt search may involve sequentially checking different parts of the pending interrupt record to check which types of virtual interrupts are pending, and so if the interrupt search keeps being aborted because further interrupt search trigger events occur, then the part of the pending interrupt record which is checked later on in the search procedure could be tracking some pending interrupts which remain undetected because the interrupt search was aborted before the search reached that part of the pending interrupt record. Such an abort mechanism would statistically tend to favour those interrupts which are recorded in the part of the pending interrupt record searched earliest during the interrupt search procedure, which may be undesirable as this could lead to other interrupts being denied service.

Instead, in the examples described in more detail below, rather than aborting a current interrupt search on receipt of a further interrupt search trigger event while the current interrupt search is ongoing, instead a complete-and-restart mechanism is provided where the current interrupt search is allowed to complete but after completion the interrupt search is then re-started, to ensure that the full pending interrupt map is able to be checked in the current interrupt search, resulting in less favouritism towards the interrupts recorded in the early part of the pending interrupt map and hence mitigating against the denial of service problem.

Hence, in response to detecting that, partway through performing the interrupt search for a given virtual processor, a further search trigger event has occurred for the given virtual processor and a new enabled interrupt has become pending for the given virtual processor, the control circuitry may update the pending interrupt state indication to indicate a re-search state. In other words, when a search trigger event occurs and the pending interrupt status is in the "searching (enabled)" state discussed above, then the pending interrupt state indication can be updated to switch to the re-search state. When the interrupt search is completed, and the pending interrupt status indication indicates the re-search state, then the interrupt search circuitry may re-start the interrupt search for the given virtual processor, so that the later arriving interrupt can then be taken into account. This approach reduces the risk of denial of service, compared to the alternative of aborting the current search in response to the further search trigger event as discussed earlier.

On the other hand, if a search trigger event occurs while the pending interrupt state indication indicates the "searching" state, then the current search can be allowed to complete without switching to the re-search state and so no re-start of the search is necessary upon completing the current search. This is because the "searching" state (as distinct from the "searching (enabled)" state indicates that no further interrupt has been received since the start of the currently ongoing search, and so performing a further search in response to the further search trigger event would be redundant as the outcome would already be known from the current search. Therefore, latency can be reduced by avoiding performing another search in response to the further search trigger event received while a current search is ongoing. This improves performance.

The virtual interrupts may be associated with corresponding memory addresses. For example the virtual interrupts may be message-based interrupts which are triggered by a received message received by the interrupt distributor. For example the virtual interrupts could be message signalled interrupts according to the PCI Express (PCIe) standard. The memory address associated with a given message based interrupt may be an indication of the type of interrupt to be delivered to the targeted virtual processor. The pending interrupt record may indicate (explicitly or implicitly) the memory addresses corresponding to pending virtual interrupts to be handled by the given virtual processor. For example the pending interrupt record could provide a bitmap with a number of bits each indicating whether there is a pending interrupt for a corresponding memory address (i.e. for a corresponding interrupt type). Those bits may be stored within the memory address space and may require a relatively large number of cache lines to store the respective bit indications for each type of virtual interrupt which could be received, and therefore may require a relatively long time to search. The techniques discussed above can be particularly useful for reducing the latency associated with searching this type of pending interrupt record.

In one example, the virtual processor interrupt tracking information may also comprise a coarse enabled pending interrupt record which tracks, at a coarser granularity than the pending interrupt record, which groups of interrupt types include at least one interrupt type for which an enabled pending interrupt is to be handled by the given virtual processor. Hence, although the coarse enabled pending interrupt record may be less precise, it may be faster to search because each indication in the coarse enabled pending interrupt record may correspond to a larger group of interrupt types than in each indication in the pending interrupt record. The coarse enabled pending interrupt record may specify those groups of interrupt types which include enabled pending interrupts, and disregard those groups of interrupt types which only include disabled pending interrupts. This enables faster searching for enabled interrupts, which may be useful on a residency change for a given virtual processor. The interrupt search circuitry may suppress searching of a portion of the pending interrupt which corresponds to a group of interrupt types for which the coarse enabled pending interrupt record indicates that there are no enabled pending interrupts to be handled by the given virtual processor. Hence, the coarse enabled pending interrupt record can eliminate the need to search blocks of addresses within the pending interrupt record which do not correspond to any enabled pending interrupts, which speeds up the interrupt search.

In addition to the coarse enabled pending interrupt record, some examples may also provide a coarse pending interrupt record which tracks, at a coarser granularity than the pending interrupt record, which groups of interrupt types include at least one address corresponding to a pending interrupt (either an enabled pending interrupt or a disabled pending interrupt) to be handled by the given virtual processor. Hence, while the coarse enabled pending interrupt record tracks blocks of memory addresses which include enabled pending interrupts, the coarse pending interrupt record may record blocks which include either enabled or disabled pending interrupts. This could be useful if it is also sometimes needed to search for disabled pending interrupts in addition to enabled pending interrupts, or for controlling status changes in the pending interrupt status indication.

Other approaches may not provide the coarse pending interrupt record, but could merely provide the coarse enabled pending interrupt record, if it is considered unlikely that a search for disabled pending interrupts is needed.

The search trigger event which causes an interrupt search to be performed could be a range of different types of events. For example the search trigger event could be a reset event which causes the processing system to be reset to a known state, in which case it may be desirable to do a search of the interrupt tracking information which may indicate that some virtual interrupts had not been serviced before the reset. Alternatively the search trigger event could be a change of operating mode of a physical processor or the execution of an explicit instruction requesting that an interrupt search is performed. However, in one example the search trigger event may be a virtual processor residency change event which indicates that the given virtual processor is to become resident on one of the physical processors.

In some examples the interrupt tracking information may be stored in a memory system. The control circuitry may have access to a number of sets of interrupt tracking information, with each set of interrupt tracking information corresponding to a respective virtual processor. As the number of virtual processors may be relatively large, in practice the interrupt distributor and/or control circuitry may not maintain local storage of the interrupt tracking information sufficient to store the interrupt tracking information for all virtual processors. Instead, a cache could be provided to cache at least a portion of the interrupt tracking information for at least a subset of the virtual processors, and if interrupt tracking information is required for other virtual processors then this can be obtained from the memory system, but this may be slower than if the information is available in the cache.

In one example, the control circuitry may maintain separate pending interrupt status indications for the cache and the memory respectively. A cache pending interrupt status indication may indicate the pending interrupt status associated with a cached portion of the pending interrupt record for the given virtual processor cached in the cache and a memory pending interrupt status indication may indicate the pending interrupt status associated with a memory-based portion of the pending interrupt record for the given virtual processor that is stored in the memory system. The memory-based portion may include the cached portion (as the cached portion may be a copy of the corresponding data stored in memory). However sometimes the cached portion may be only a subset of the memory-based portion of the pending interrupt record. Also, for a writeback cache sometimes the cached portion of the pending interrupt record could differ from the corresponding memory based portion of the pending interrupt record if the cached portion is dirty. By providing separate pending interrupt status indications corresponding to the cached portion and the memory-based portion respectively, this can allow the interrupt search circuitry to make more targeted decisions on whether it is necessary to search the cache and/or the memory to find the pending interrupts that may be outstanding for a given virtual processor. For example, if it is known that the cache is empty of pending interrupts for a given virtual processor then the cache lookup could be omitted and memory could be looked up directly without first going via the cache.

FIG. 1 illustrates an example of a data processing system 2 having a number of integrated circuits (chips) 4 which are in communication with each other. Each chip includes a number of physical processors (CPUs) 6 and has some on-chip memory 8 accessible to the processor on that chip. Each chip may also have one or more device interfaces 10 from which messages may be received from a corresponding device in communication with that interface. For example, the device could be a peripheral device, input/output controller, network controller, etc. The number of physical processors 6 and device interfaces 10 on each chip can vary from chip to chip. It will be appreciated that the particular number of chips shown in FIG. 1 is just one example. Other examples may only have a single chip or could have a greater number or smaller number of chips.

Each chip 4 has access to a shared memory 12 which can store data accessible to any of the chips 4. In the example of FIG. 1, the shared memory 12 is an off-chip memory, but in other examples the shared memory could instead be located on one of the chips 4 but be accessible to other chips 4. Data can be loaded from the shared memory 12 into the on-chip memory 8 of a particular chip. Individual physical processors 6 may also have caches which may cache data from either the on-chip memory 8 of that chip 4 or the shared memory 12. It will be appreciated that FIG. 1 is a simplified diagram, and many other features of the data processing system 2 may be provided although not shown.

In one example the data processing system 2 may be a virtualised server which may provide services such as web hosting, cloud services, database management or storage management.

An interrupt controller is provided to handle interrupts which require interruption of processing on one or more of physical processors. For example interrupts could be based on messages sent from a given device via the device interface 10. The interrupt controller is distributed, so that each of the chips 4 includes a respective general interrupt controller (GIC) 14 which is responsible for passing interrupts to the physical processors 6 on the corresponding chip. The GICs 14 on each chip are in communication with each other via an interrupt interconnect 16. The respective chips 4 may also be in communication with each other via a memory interconnect 18 which may also allow reading and writing of data in the shared memory 12. While in FIG. 1 the interrupt interconnect 16 and the memory interconnect 18 are shown as separate, in other examples these may be combined to form a shared interconnect used for both interrupts and memory accesses.

The data processing system 2 is a virtualised processing system and so is capable of executing a number of virtual processors (or virtual machines), with each virtual processor being able to be mapped to different physical processors of the system, including processors on different chips 4. Some virtual processors may require hardware features which are only provided on certain physical processors, so this may restrict which physical processor can have that virtual processor mapped to it, while other virtual processors may not have such restrictions. Decisions on mapping virtual processors to physical processors may be made by a hypervisor or other software element running on the processing system 2.

Figure 2:
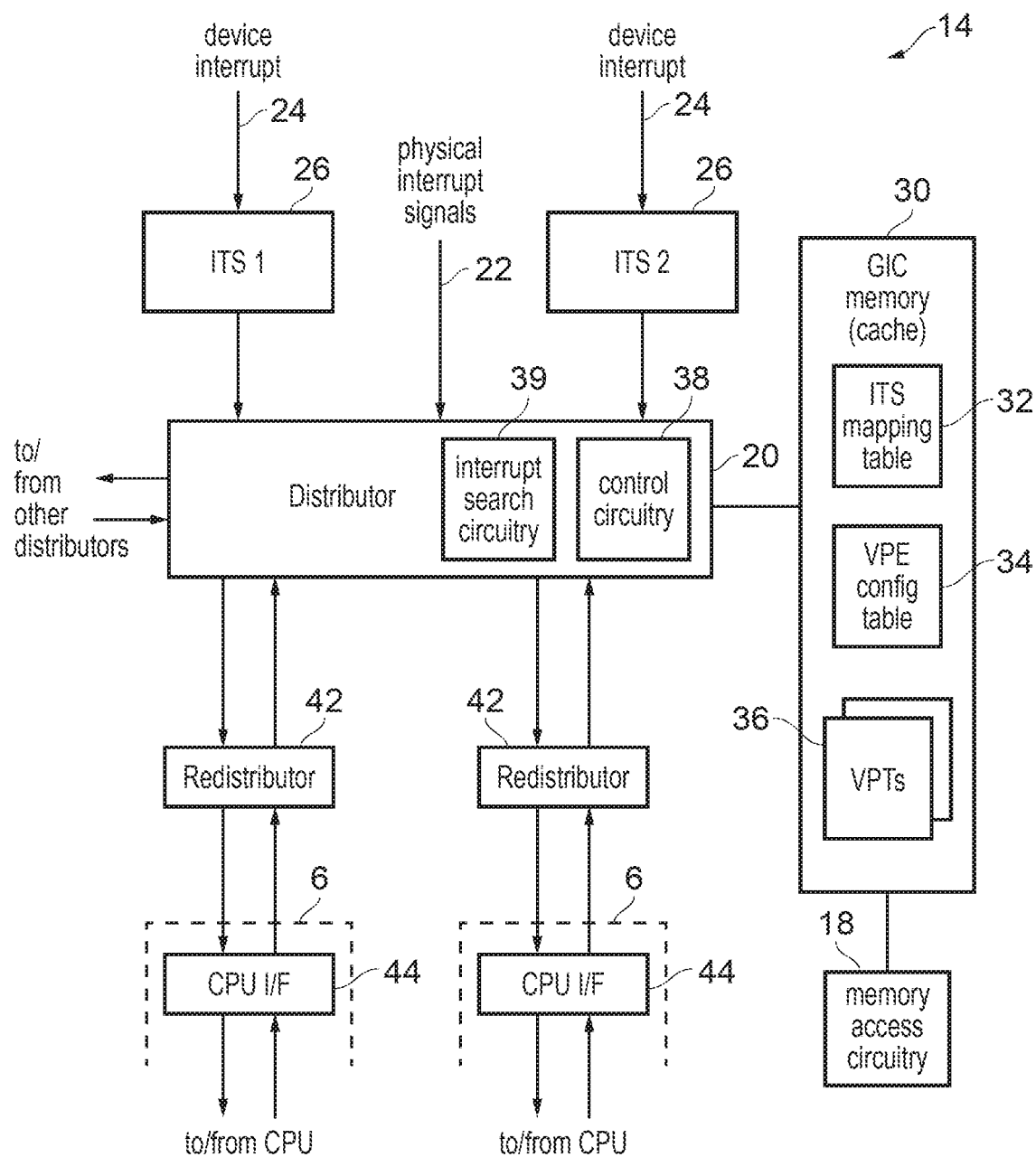
FIG. 2 shows an example of one of the interrupt controllers.

FIG. 2 shows an example of one of the GICs 14 which is responsible for distributing interrupts to the physical processors 6 on a given chip 4 and the virtual processors running on those physical processors 6. The GIC 14 includes an interrupt distributor 20 which is responsible for routing decisions on how to route a received interrupt request to the relevant physical processor which can handle the interrupt request. Interrupt requests received by the distributor 20 may include physical interrupt signals 22 which are asserted on wired paths of the apparatus 2. The interrupt requests may also include device interrupts 24 which are received from devices via the device interfaces 10. As the complexity of data processing systems grow, the increased number of on-chip interrupts may cause routing congestion and management complication if they are all associated with physical wired paths, and so for some systems a more efficient way of managing interrupt handling may be to use message based interrupts (such as the message signalled interrupts (MSI) used for device interfaces implemented using a PCI Express® bus). A message based interrupt may be a transaction which specifies a memory address, with the particular memory address specified representing the type of interrupt being asserted. This allows a single wired communication channel to be shared between a number of interrupt types distinguished by the respective addresses of the message. For message based interrupts received as device interrupts 24 from a given device interface 10, an interrupt translation service (ITS) circuit 26 may translate the message into the appropriate interrupt type, by looking up the address specified by the message in a table 32 defining the various interrupt types associated with different addresses. For example the interrupt translation service may generate an interrupt ID from the message received from the device and may identify which particular target processor should handle the interrupt, which could be a physical processor or a virtual processor. A virtual processor may also be called a "virtual processing element" or VPE for short.

The GIC 14 has memory access circuitry 18 which controls reading and writing of data from/to the shared memory 12 or on-chip memory 8 of the corresponding chip 4. The GIC 14 may also have some internal memory 30 which can be used to cache various tables or other information read from the on-chip memory 8 or the shared memory 12. The internal memory 30 stores an ITS mapping table 32 which is used by the ITS 26 to map a message based interrupt to the interrupt ID and target physical or virtual processor. The GIC memory 30 may also cache a VPE configuration table 34 which provides virtual-to-physical processor mapping information indicating which physical processor in the overall system 2 a given virtual processor is mapped to. The VPE configuration table 34 may potentially be out of date and differ from a corresponding set of information stored as shared virtual processor mapping information within the shared memory 12 which is accessible to all of the GICs 14 in the system. For example this shared information could be a set of virtual processor tables (VPTs) 36, which are described in more detail below. Although the VPTs primarily reside within the shared memory 12, some VPTs, or parts of VPTs, could optionally be cached within the GIC memory 30.

The distributor 20 uses the VPE configuration table 34 to decide how to route the interrupts 22, 24 to their respective destinations. If the VPE configuration table 34 indicates that a particular VPE targeted by an interrupt is mapped to one of the CPUs 6 for which that GIC 14 is responsible, then the interrupt can be routed to the corresponding physical processor 6. If the target virtual processor is mapped to a CPU 6 on a different chip 4, for which a different GIC 14 is responsible, then the distributor 20 may route the interrupt over the interrupt interconnect 16 to a further interrupt controller 14 on the other chip 4, which can then pass it on to the required physical processor.

For distributing interrupt requests to the processors which a given GIC 14 is responsible for, each physical processor 6 may have a corresponding redistributor 42 which is responsible for routing the signals to that physical processor, and is in communication with the distributor which makes more global decisions. The redistributor 42 may be responsible for controlling exchange of signals with a particular physical processor, and may communicate with a CPU interrupt interface 44 which is within the corresponding physical processor 6 and is configurable by a hypervisor running on the CPU to control handling of interrupts by VPEs running on the CPU.

The GIC 14 includes interrupt search circuitry 39 for performing searches for pending interrupts for a given VPE, based on the VPTs 36, and control circuitry 38 for maintaining the VPTs 36 and controlling when and how the interrupt search circuitry 39 performs the searching. While FIG. 2 shows the control circuitry 38 and interrupt search circuitry 39 being provided within the interrupt distributor 20 they could also be implemented elsewhere.

Figure 3:
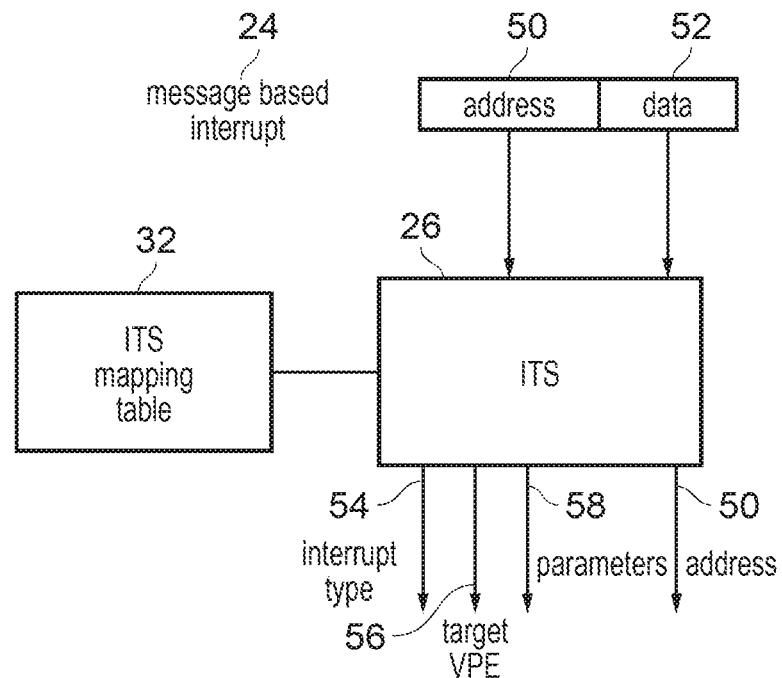
FIG. 3 shows an example of a message based interrupt for which an address specified by the message is used to determine the interrupt type.

FIG. 3 shows in more detail the interrupt translation functionality provided by the ITS 26. The received device interrupt is a message based interrupt 24 which specifies an address 50 and some data 52. The ITS 26 looks up the address 50 in the ITS mapping table 32, to identify an interrupt type 54, a target virtual processor 56 which is to handle the interrupt, and one or more parameters 58 of the interrupt which could be based on the data field 52 of the message based interrupt 24 or could be based on information stored in the ITS mapping table 32. For example the parameters 58 could indicate properties of the interrupt, such as an interrupt priority for controlling whether the interrupt should pre-empt other pending interrupts of lower priority. The address 50 associated with the message 24 may also be passed through by the ITS 26 or alternatively may be omitted from the signals passed to the distributors 20. Hence, by using an address 50 to identify the type of interrupt, this allows a single communication channel to be shared amongst a number of different types of interrupts which can be more efficient in hardware compared to having dedicated wired channels for different types of interrupts.

Figure 4:
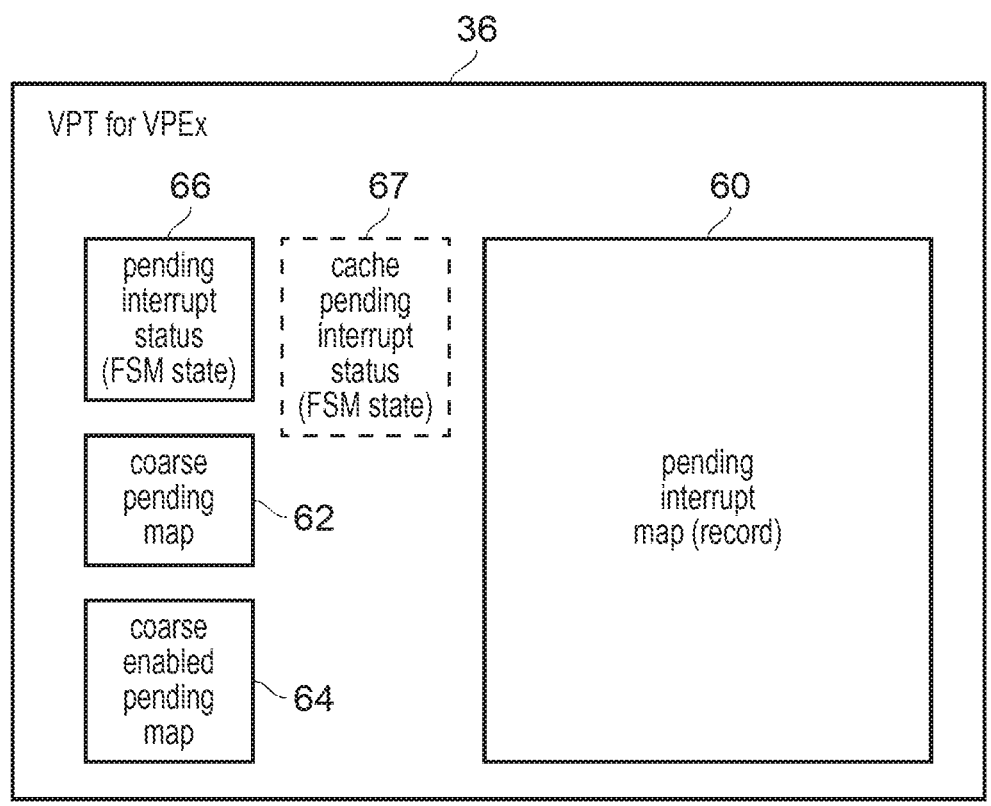
FIG. 4 shows an example of virtual processor interrupt tracking information.

FIG. 4 shows an example of one of the virtual processor tables (VPTs) 36, which provides virtual processor interrupt tracking information for a given virtual processor VPEx. As shown in FIG. 4, the interrupt tracking information may include a pending interrupt record (also referred to as a pending interrupt map) 60 which tracks which types of interrupts are pending for the given virtual processor VPEx, a coarse pending map 62 which summarises which blocks of addresses in the pending interrupt map 60 have pending interrupts indicated, a coarse enabled pending map 64 which indicates which blocks of addresses of the pending interrupt map 60 have pending interrupts which are enabled (excluding those pending disabled interrupts which may have been masked out by interrupt masking information associated with the given virtual processor), and a pending interrupt status indication 66 which indicates one of a number of finite state machine (FSM) states tracking the pending interrupt status for the given virtual processor VPEx.

Figure 5:
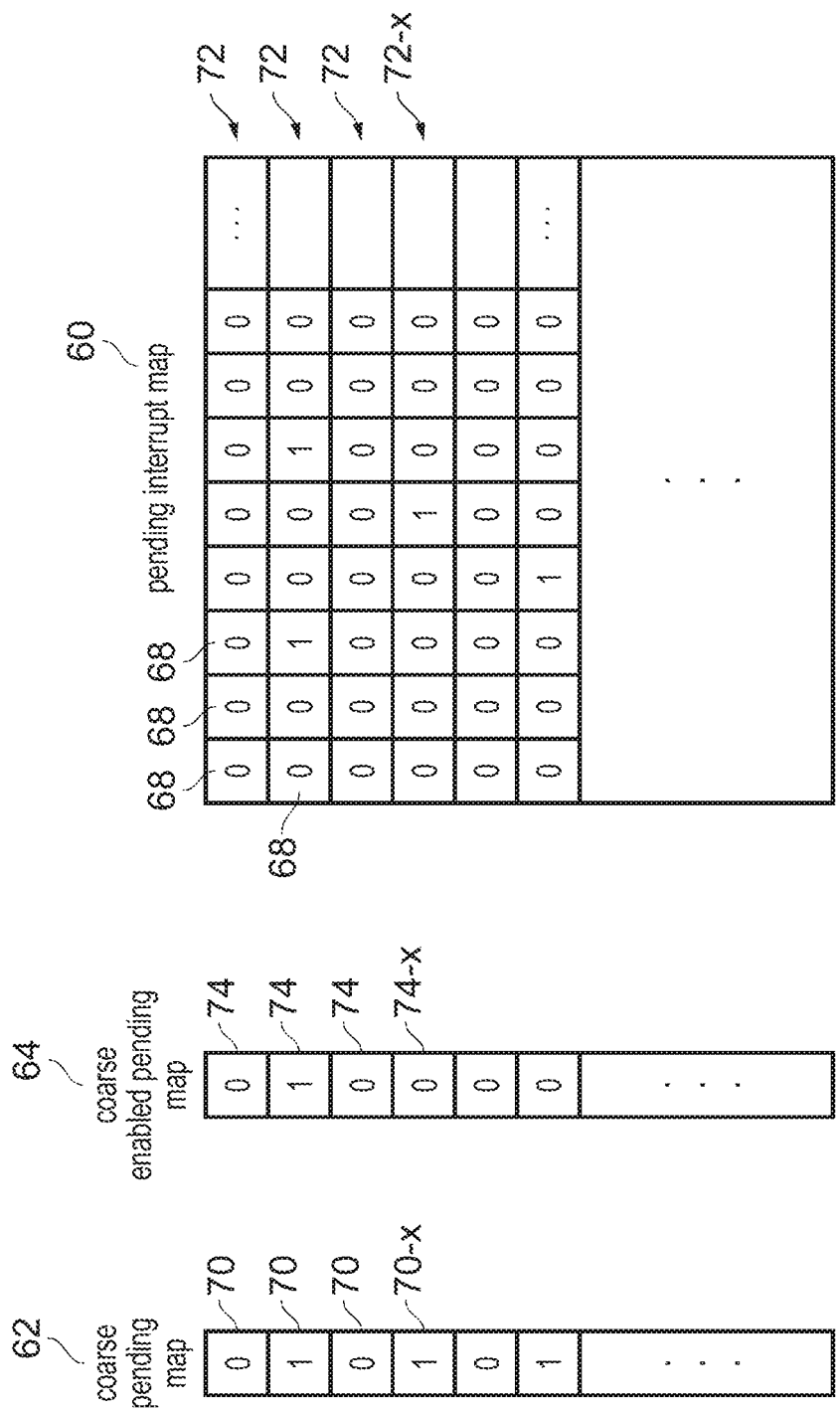
FIG. 5 shows an example of a pending interrupt map, a coarse pending map and a coarse enabled pending map.

FIG. 5 shows an example of the pending interrupt map 60, the coarse pending map 62 and the coarse enabled pending map 64. The pending interrupt map 60 tracks those pending interrupts which are have not yet been able to be delivered to the corresponding virtual processor VPEx. The pending interrupt map 60 includes a number of bit flags 68 which each correspond to a given type of interrupt that could be indicated as the interrupt type 54 by the ITS 26 (or, equivalently, this can be viewed as indicating the addresses 50 of message based interrupts which are pending). It will be appreciated that the pending interrupt map 60 merely indicates the presence of pending interrupts. The parameters 58 associated with those interrupts may be stored separately.

When a given virtual processor VPEx becomes resident on a particular CPU 6, then it may be needed to search the pending interrupt map 60 to identify any pending interrupts which may have been received while that virtual processor was non-resident. The pending interrupt map 60 may be stored in the shared memory 12 or on-chip memory 8 and it may be relatively slow to read in the various blocks of data in the pending interrupt map 60 and traverse that data to identify which interrupts are pending. To speed up such searches, the coarse pending map 62 and the coarse enabled pending map 64 may be provided. The coarse pending map 62 includes a number of bit flags 70 which each correspond to a block 72 of bit flags 68 within the pending interrupt map 60. Each coarse pending map bit flag 70 corresponds to the result of an OR reduction operation combining all of the bit flags 68 within the corresponding block 72 of the pending interrupt map 60 using a logical OR operation, so that the bit flag 70 in the coarse pending map 62 indicates a 1 if there are one or more pending interrupts indicated within the corresponding block 72. If all of the bit flags in the corresponding block 72 of the pending interrupt map 60 are 0, indicating that there are no pending interrupts within the corresponding group of interrupt types, then the coarse pending map bit flag 70 for that block 72 is 0.

Similarly, the coarse enabled pending map includes a number of bit flags 74 which each correspond to one of the blocks 72 of the pending interrupt map 60, but for the coarse enabled pending map 64 the bit flag 74 indicates 1 if there is at least one enabled pending interrupt in the corresponding block 72 but indicates 0 if there are no enabled pending interrupts in the corresponding block 72, even if there is at least one disabled interrupt pending. For example, for block 72-*x* in FIG. 5, there is one pending interrupt within that block and so the coarse pending map bit flag 70-*x* is 1, but if this pending interrupt is a disabled interrupt then the corresponding coarse enabled pending map bit flag 74-*x* would be 0. When a new pending interrupt is received then the distributor 20 may check whether the corresponding type of interrupt is enabled or disabled and then decide whether to set the coarse enabled pending map bit flag 74 for the corresponding group of interrupt types depending on whether the interrupt is enabled or disabled. In contrast, the coarse pending map bit flag 70 may be set regardless of whether the received interrupt was enabled or disabled.

It will be appreciated that the particular encoding of 0 and 1 for the respective bit flags 70, 74, 68 in FIG. 5 is just one example, and other examples could use a different encoding (e.g. swapping the meaning of 0 and 1).

The information in the coarse pending map 62 and the coarse enabled pending map 64 can be used to speed up searching of the pending interrupt map 60. Some events (such as the VPE becoming resident on a particular physical CPU 6) may be treated as a search trigger event triggering a search of the pending interrupt map 60 to identify pending interrupts to be delivered to the corresponding VPE. Any identified interrupts may be delivered to the corresponding CPU for that VPE and then the "pending" flag 68 for the delivered interrupt type may be cleared in the pending interrupt map 60. If searching for either disabled or enabled pending interrupts, then the interrupt search circuitry 39 can use each coarse pending map bit 70 to determine whether it is necessary to load from memory and search through the corresponding block 72 of bit flags 68 in the pending interrupt map 60. Similarly, if searching for enabled pending interrupts only (excluding disabled pending interrupts), then the interrupt search circuitry 39 can use the coarse enabled pending map 64 to determine which blocks 72 of the pending interrupt map 60 need loading and searching and can exclude from the search any blocks 72 which the coarse enabled pending map 64 indicates does not contain any enabled interrupts. By avoiding the need to load and search some blocks of the pending interrupt map 60, this can speed up interrupt searches and hence reduce the downtime when switching between which virtual processor is resident on a particular physical processor 6.

Figure 6:
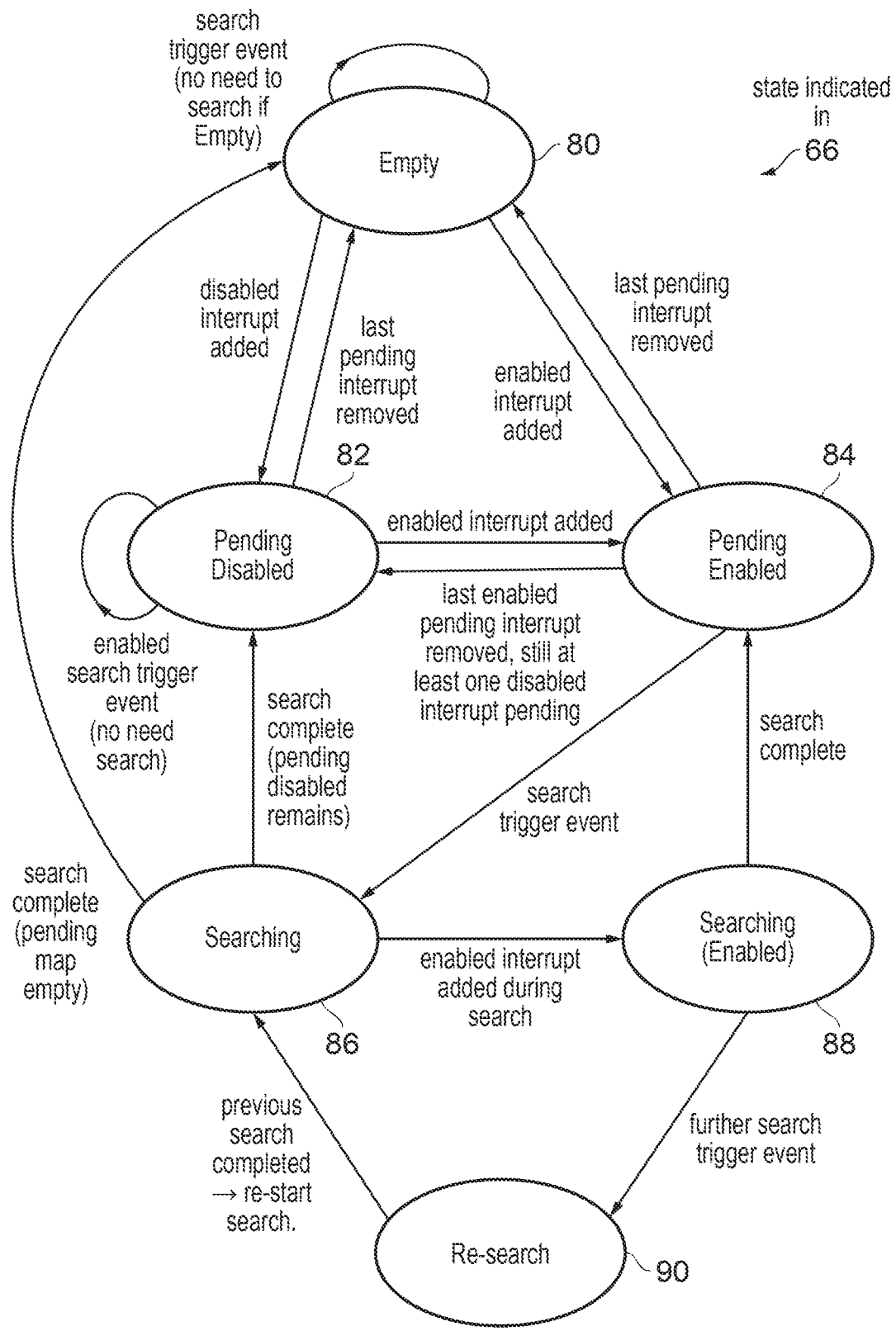
FIG. 6 illustrates a finite state machine (FSM) for controlling transitions between states indicating a pending interrupt status for a given virtual processor.

The pending interrupt status 66 indicates one of a number of states for a given virtual processor VPEx according to a finite state machine (FSM) as shown in the example of FIG. 6. For example the pending interrupt status indication may be a state indicator identifying a particular one of these states 80 to 90. In this example, the FSM transitions between the following set of states:

Empty 80: the pending interrupt map 60 is completely empty and does not indicate any pending interrupts for the given virtual processor VPEx.

Pending disabled 82: the pending interrupt map 60 for VPEx indicates at least one pending interrupt, but all of the pending interrupts indicated in the pending interrupt map 60 for VPEx are disabled interrupts.

Pending enabled 84: the pending interrupt map 60 indicates that at least one pending interrupt is pending for the given virtual processor VPEx, which includes at least one enabled interrupt.

Searching 86: an interrupt search is ongoing for the given virtual processor VPEx, but no further enabled interrupts were added to the pending interrupt map 60 while the search was ongoing.

Searching (enabled) 88: an interrupt search is ongoing for the given virtual processor VPEx, and during the search another enabled interrupt was added to the pending interrupt map 60.

Re-search 90: a further search trigger event occurred while performing a previous search, in a case when an enabled interrupt was added to the pending interrupt map 60 during the search, so that there is a risk of that interrupt being missed, and so when the search is complete the search should be re-started so that the new enabled interrupt can be considered.

The control circuitry 38 may control transitions between the states of the FSM, to update the pending interrupt status 66 depending on various events occurring for a given virtual processor VPEx. For example, when in the empty state 80, when a disabled interrupt is added to the pending interrupt map 60, then the FSM state is transitioned from empty 80 to pending disabled 82. In contrast, if an enabled interrupt is added then the transition would be from empty 80 to pending enabled 84. If a search trigger event, such as the given virtual processor VPEx becoming resident, is detected while the FSM state is empty 80, then there is no need for the interrupt search circuitry 39 to actually perform the search as it is already known from the pending interrupt status 66 that the pending interrupt map 60 will not indicate any pending interrupts.

When the current state is pending disabled 82, then if the last pending interrupt is removed from the pending interrupt map 60 so that there are no more pending interrupts remaining for the given virtual processor VPEx, then the state 66 transitions back to empty 80. If while in pending disabled 82 an enabled interrupt is added to the pending interrupt map 60 then the state 66 transitions to pending enabled 84. If a search trigger event occurs which indicates that a search is to be carried out, to detect whether there are any pending enabled interrupts for VPEx while the current pending interrupt status is pending disabled 82, then there is no need to perform a search as the pending disable status already indicates that there are no enabled interrupts. Alternatively while not shown in FIG. 6, if a system sometimes needs to search for pending disabled or enabled interrupts, then the search trigger event could trigger a transition from pending disabled 82 to searching 86, but this may not be essential in systems which only require searching for enabled pending interrupts.

If the current state is pending enabled 84 and the last pending interrupt is removed from the pending interrupt map 60 so that the pending interrupt map now is completely empty, then the state transitions back to empty 80. If the last enabled pending interrupt is removed but there is still at least one disabled interrupt pending then the control circuitry 38 transitions the pending interrupt status from pending enabled 84 to pending disabled 82. If a search trigger event is detected while the current state is pending enabled 84 then the control circuitry triggers the interrupt search circuitry 39 to start searching and the pending interrupt status 66 switches to the searching state 86.

When the current state 66 for VPEx is searching 86, and the interrupt search circuitry 39 completes its search, then there are two possible transitions. During the interrupt search, any enabled pending interrupts may be identified based on the pending interrupt map 60 and may then be delivered for processing by the corresponding virtual processor VPEx, so that after the search is complete there may no longer be any enabled pending interrupts remaining as they have all been delivered. If there are any blocks of interrupt types for which the coarse pending bit 70 is set but the coarse enabled pending bit 74 is clear then it can be determined that at least one pending disabled interrupt remains. If both the coarse pending and enabled pending bits 70, 74 were set for a given block then the searching through the pending interrupt map 60 for that block may identify which types are pending and then corresponding interrupt masking information can be used to distinguish disabled and enabled interrupts so that it can be determined whether there will be any pending disabled interrupts remaining. Hence, if following the completion of the search at least one disabled interrupt remains pending, then the control circuitry 38 switches the state 66 back to pending disabled 82, while if following the search it is determined that the pending map is completely empty then the state returns to the empty state 80.

If, while in the searching state, a further enabled interrupt is added to the pending interrupt map 60 during the search, then the control circuitry 38 switches the FSM state 66 to searching (enabled) 88 for the corresponding virtual processor VPEx. If, while in the searching (enabled) state 88, the currently on going search is completed, then the FSM state is switched by the control circuitry 38 to pending enabled because the interrupt that was added during the search will still be outstanding. In this case, there is no need to re-start the search because there has not been any other search trigger event since the previous search was required.

On the other hand, if while in the searching (enabled) state 88 a further search trigger event occurs, then the FSM state 66 is switched to the re-search state 90. This indicates that a further search should be triggered once the current search completes. Hence, if it is detected that the interrupt search circuitry 39 has completed its search and the current state is re-search 90, then the control circuitry 38 triggers the interrupt search circuitry 39 to re-start its search and the FSM state switches back to the searching state 86. If a late arriving interrupt added partway through a search has been encountered, and a further reason to search the interrupt map has occurred, then it cannot be assumed that the previously performed search would be sufficient to locate that late arriving interrupt and so a repeat of the search may be needed. However, by allowing the initial search to complete this means that potential high priority interrupts which may be recorded within some of the later checked portions of the pending interrupt map 60 may still be detected during the initial search, whereas if the initial search had been aborted upon receipt of the further search trigger event then these higher priority interrupts could risk being denied service if they are then lower priority than the newly added interrupt which was added partway through the earlier search. Hence the re-start approach reduces the risk of denial of service of certain types of interrupts.

Hence, by providing a finite state machine with transitions between states and recording the current state which tracks whether a search is ongoing and whether there are any pending enabled or disabled interrupts for a given virtual processor, this can help speed up searching because it allows searches to be eliminated entirely if the current state is empty 80 or if the search is for enabled interrupts only and the current state is pending disabled 82, and also by providing the coarse enabled pending map 64 this can further accelerate searches by allowing some blocks 72 of the pending interrupt map 60 to be omitted from the search if it is known they do not contain any enabled pending interrupts.

FIG. 4 shows the virtual processor tracking information for a single virtual processor, but it will be appreciated that a number of sets of virtual processor tracking information may be stored in memory for the respective virtual processors. It will be appreciated that the particular format of the tracking information shown in the examples above is just one example and other formats could also be used.

VPTs 36 for every virtual processor that has been initialised may be recorded within the shared memory system 12, and could potentially be cached within on-chip memory 8 or the interrupt controller memory 30. Typically the interrupt controller memory 30 may only cache tracking information for a certain subset of virtual processors, for example a certain number of recently encountered virtual processors. Hence, when receiving a device interrupt 24 which the ITS 26 decides should target a particular virtual processor VPEx, if the tracking information 36 for VPEx is currently within that interrupt controllers cache 30 then it could update the FSM state 66 and pending interrupt map 60 within its cache, whereas if the received interrupt targets as virtual processor for which the interrupt controller does not have any cached information then the control circuitry 38 may control the memory access circuitry 18 to write information to memory which causes the pending interrupt to be recorded in the pending interrupt map 60 associated with the target virtual processor. Also, the control circuitry 38 may read the pending interrupt status 66 from memory for the target virtual processor and then cause any update required to be written to the pending interrupt status indication 66.

As shown in the dotted lines in FIG. 4, in some cases it may be possible for the control circuitry 38 of a given interrupt controller 14 to maintain a separate cache pending interrupt status indication 67 in addition to the pending interrupt status indication 66 stored in the VPT 36 for the given virtual processor VPEx in memory. The control circuitry 38 may maintain cached pending interrupt status indication 67 for a certain number of virtual processors which have recently been encountered. For example these could include the virtual processor which is currently resident on the CPU 6 for which that interrupt controller is responsible, as well as one or more recently resident virtual processors. This cache pending interrupt status 67 could differ from the pending interrupt status 66 recorded in memory within the corresponding virtual processor's VPT. For example, as while a given virtual processor is resident on a particular physical processor 6 it is unlikely that it will also be resident elsewhere then it may not be a problem that the VPT 36 in memory is out of date relative to the cached pending interrupt status, provided that if the cached pending interrupt status 67 for a given virtual processor maintained within the interrupt controller memory 30 is flushed then it is written back to the pending interrupt status 66 in memory. By maintaining separate cache and memory pending interrupt status indications 67, 66 which may each cycle through the FSM state shown in FIG. 6 depending on any events associated with adding interrupts to the pending interrupt map 60 stored within the cache or the memory, this allows the interrupt search circuitry 39 to make decisions as to whether it is necessary to search parts of the VPT 36 stored in the cache or the memory as appropriate. Also, this allows for writebacks to memory to be deferred for performance reasons if not needed yet.

It will be appreciated that the example of the finite state machine in FIG. 6 is just one example, and other implementations could add additional states or could remove some of the states shown in FIG. 6. For example, if an implementation never needs to search for interrupts including both disabled and enabled interrupts, but only supports interrupt searches for pending enabled interrupts, then it may not be necessary to distinguish the empty state 80 and the pending disabled state 82 and instead these states could be combined into a single state. Hence, the example of FIG. 6 does not exclude the possibility of additional or alternative states being defined.

Figure 7:
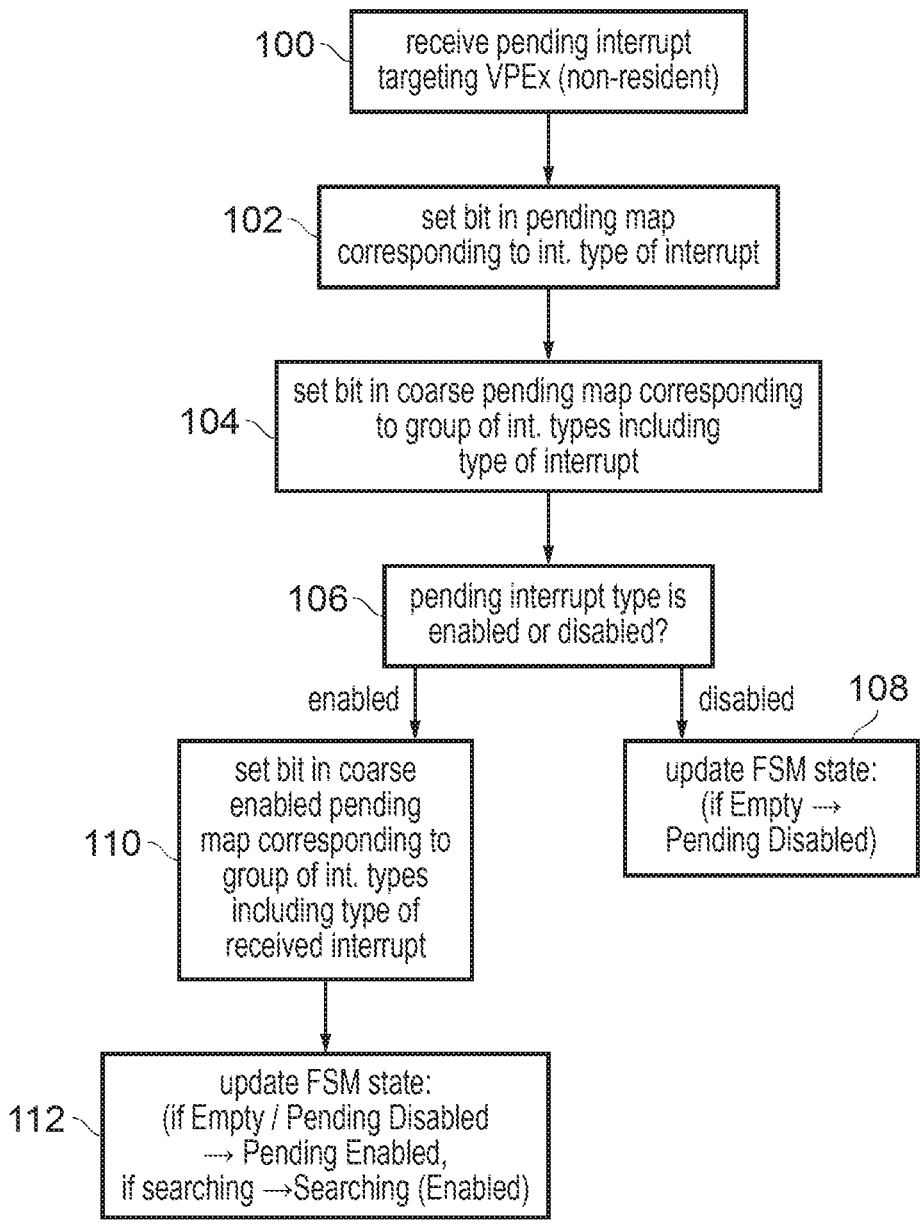
FIG. 7 is a flow diagram showing handling of a pending interrupt received for a non-resident virtual processor.

FIG. 7 is a flow diagram showing actions taken on receipt of a pending interrupt 24 which the ITS 26 determines targets a given virtual processor VPEx which is currently non-resident. If the target virtual processor had been resident then it could simply be delivered to the corresponding processor 6 and it may not be necessary to set a pending bit in the pending interrupt map 60.

At step 100 a pending interrupt is received targeting VPEx which is currently non-resident. In response at step 102 the control circuitry 38 triggers setting of a bit in the pending interrupt map 60 which corresponds to the interrupt type of the received interrupt. The mapping function for mapping the interrupt type 54 of the received interrupt to the memory address in the memory system where the corresponding bit in the pending interrupt map 60 is stored could be hardwired (with a fixed hardware mapping) or could be variable based on a programmable table accessible to the control circuitry 38. At step 102, the update to the pending interrupt map 60 for VPEx could be done in the cache 30 of the interrupt controller 14 or could be done in memory 8, 12 depending on whether the relevant information for that target VPEx is currently cached.

At step 104 the control circuitry 38 controls setting of a corresponding bit 70 in the coarse pending map 62, where the set bit corresponds to the group of interrupt types which includes the type of the received interrupt. Again, an address mapping function may be used to select which memory address is written with the bit set at step 104, and this update could be done either within the cache 30 or within the memory 8, 12.

At step 106 the control circuitry determines whether the received interrupt is of a type which is enabled or disabled, based on interrupt masking information associated with VPEx. If the received interrupt type is indicated as disabled, then at step 108 the control circuitry checks the current pending interrupt status 66, 67 for the target virtual processor VPEx, and if the current interrupt status is empty 80 then it is updated to become pending disabled 82, while if the current status was any state other than empty 80 then there is no change to the current status.

If the pending interrupt type of the received interrupt was enabled then at step 110 the control circuitry 38 triggers an update of the bit 74 of the coarse enable pending map 64 which corresponds to the group of interrupt types including the type of the received interrupt, to indicate that it includes at least one enabled pending interrupt within that group of types (if that bit 74 did not already indicate this). At step 112 the control circuitry also updates the pending interrupt status for the corresponding virtual processor VPEx. If the current state was empty 80 or pending disabled 82 then the current state is switched to become pending enabled 84. If the state was already pending enabled 84 then there is no change. If the current state was searching 86, then the status 66 for VPEx is updated to indicate the searching (enabled) state 88.

Figure 8:
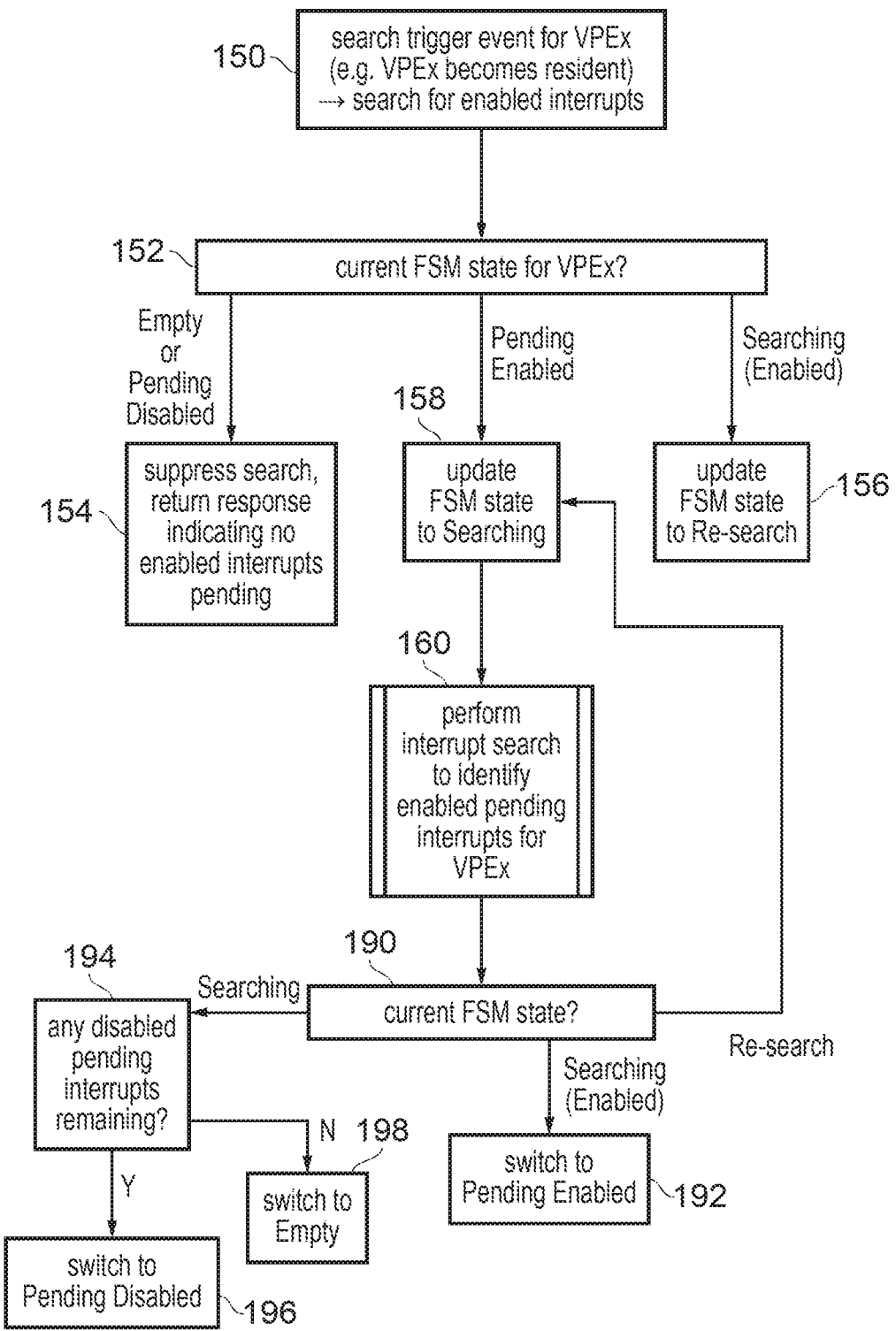
FIG. 8 is a flow diagram showing a method of responding to a search trigger event for a given virtual processor.

FIG. 8 is a flow diagram showing processing performed when a search trigger event is detected. At step 150 the control circuitry 38 detects that a given virtual processor VPEx has encountered a search trigger event. For example the search trigger event could be that VPEx has been made resident on one of the physical processors 6 for which that interrupt controller 14 is responsible. Hence a search for enabled interrupts is required. During the search, the enabled interrupts may be identified and delivered for processing by the virtual processor and then can be cleared from the tracking information 36 recorded for that virtual processor VPEx. If the full system search is needed then this can be a relatively expensive operation in terms of processing time, and so it is desirable to be able to accelerate this if possible.

Hence, at step 152, before triggering the search the control circuitry 38 checks the current finite state machine state 66 indicated by the pending interrupt status 66 for VPEx. If necessary, this can be loaded from memory if it is not already cached. If the current state is empty 80 or pending disabled 82 then at step 154 the search operation can be suppressed because it is known that there will be no pending enabled interrupts indicated in the pending interrupt map 60, so this eliminates the latency of fetching blocks of the pending interrupt map 60 from the memory system 8, 12 and checking those blocks for bits corresponding to enabled interrupts. Hence, in this case the control circuitry does not invoke the interrupt search circuitry 39 but simply returns a response indicating that there are no enabled interrupts pending.

If the current pending interrupt status indicates that VPEx is currently in the searching (enabled) state 88 then this means the previous search is still ongoing, but at least one enabled interrupt was received since the start of that search so that that enabled interrupt may not have been detected in that search. As there has been a further search trigger event then that later received interrupt should be considered. Hence, at step 156 the control circuitry 38 updates the pending interrupt status 66 to indicate the re-search state 90, to indicate that a further search will be needed once this search is complete.

On the other hand, if at step 152 the current status is pending enabled 84 then this means no previous search was ongoing and so a new search is triggered. At step 158 the control circuitry 38 updates the pending interrupt status 66 to indicate that the VPEx is in the searching state 86 and at step 160 the control circuitry 38 controls the interrupt search circuitry 39 to start the interrupt search to identify the enabled pending interrupts which have been received for VPEx.

Figure 9:
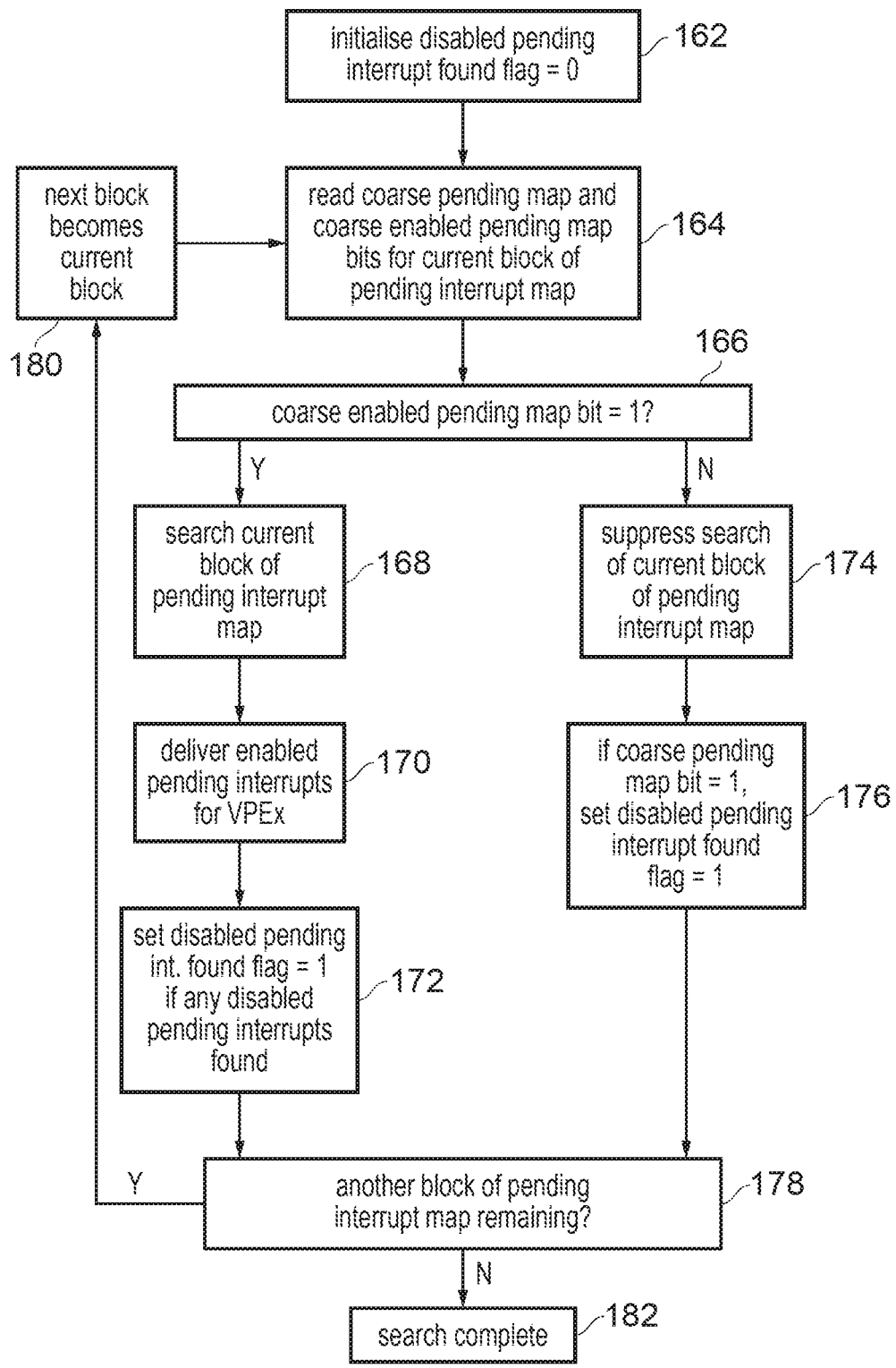
FIG. 9 is a flow diagram showing a method of performing an interrupt search in response to the search trigger event.

FIG. 9 shows step 160 in more detail. At step 162 a flag (used to track whether any disabled pending interrupts were found in the search) is initialised to a value 0 indicating that so far no disabled pending interrupts have been detected. At step 164 the interrupt search circuitry 39 reads the bits 70, 74 of the coarse pending map 62 and the coarse enabled pending map 64 which correspond to a current block 72 of the pending interrupt map to be checked next. On the first pass through step 164 the current block will be the first block of the pending interrupt map 60. At step 166 the control circuitry checks whether the relevant coarse enabled pending map bit 74 for the current block is set, indicating that there is at least one enabled interrupt indicated in the corresponding blocks 72 of the pending interrupt map 60. If so, then at step 168 the current block of the pending interrupt map 60 is searched (if necessary, the block is loaded from memory, if it is not already cached) and any pending enabled interrupts in that block are identified and delivered to the physical processor 6 which is executing the target virtual processor VPEx. The bits 68 of pending map 60 corresponding to the delivered interrupts are cleared, and also the corresponding coarse enabled pending map bit 74 is cleared (as all enabled interrupts have been delivered, there are no longer any enabled pending interrupts in that block of the pending map 60). Also at step 172 if any of the pending interrupts in that block are disabled interrupts then the disabled pending interrupt found flag is set to 1 if it was not already set to 1 to indicate that at least one disabled interrupt has been found as pending during the search. If no disabled pending interrupts were found, the corresponding bit 70 in coarse pending map 62 can be cleared.

Alternatively, if at step 166 it was determined that the relevant bit 74 of the coarse enabled pending map 64 is set to 0, then as there are no enabled pending interrupts in the corresponding block of the pending interrupt map 60, at step 174 the search of that block 72 is suppressed and that block does not need to be loaded from memory or checked, speeding up the search. At step 176 the control circuitry 38 or the interrupt search circuitry 39 checks the coarse pending map bit 70 corresponding to the currently processed block 72 and if this is set to 1 then the disabled pending interrupt found flag is set to 1 to indicate that at least one disabled pending interrupt has been found during the search. Note that by providing the coarse pending map 62 separate from the coarse enabled pending map 64, this allows the presence of at least one disabled pending interrupt in the block to be identified even though the corresponding block 72 of the pending interrupt map 60 was not actually searched.

Regardless of whether the search was carried out for the current block or was suppressed, at step 178 the interrupt search circuitry 39 then detects whether another block 72 of the pending interrupt map 60 still remains to be searched and if so then at step 180 the next block to be searched becomes the current block for a subsequent pass through steps 164 to 178.

Eventually all of the blocks have either been searched or it has been determined based on the coarse enabled pending map 64 that it is not necessary to do the search for a block, and then once all of the blocks 72 of pending map 60 have been processed and there are no remaining blocks to be searched, then at step 182 it is determined that the search is complete with any enabled pending interrupts found in the search being delivered.

Returning to FIG. 8, once the search is complete then at step 190 the control circuitry 38 determines the current pending interrupt status 66 for the target processor VPEx for which the search trigger event was received. If the current state is re-search 90 then the method of FIG. 8 goes back to step 158 to update the status to searching and to re-start another interrupt search at step 160. This means that any enabled interrupts which were received since the start of the previous search can be identified and delivered if necessary.

If at step 190 the current state was searching (enabled) 88 then at step 192 the current state switches to pending enabled 84. If the current state was searching then at step 194 it is detected from the disabled pending interrupt found flag (as discussed with respect of FIG. 9) whether there are any disabled pending interrupts remaining and if so then at step 196 the current state is switched to pending disabled 82. If there were no disabled pending interrupts remaining and the search is completed when the current state is searching then the method proceeds from step 194 to step 198 where the current status is updated to indicate empty 80, as there are no longer any pending interrupts for VPEx.

It will be appreciated that in alternative implementations which do not distinguish the empty and pending disabled states 80, 82 as discussed above, then the steps of FIGS. 8 and 9 involving the disabled pending interrupt found flag may not be necessary. Also it will be appreciated that the use of the disabled pending interrupt found flag for tracking the presence of disabled pending interrupts is just one possible implementation and other approaches could also be used. For example rather than setting a flag which is sticky and accumulates through the processing of respective blocks 72 of the pending interrupt map 60, another approach could be to check the coarse pending map 62 independently of the search and if any bits are 1 in the coarse pending map 62 then this could indicate the presence of disabled pending interrupts.

Also, while the interrupt search circuitry 39 and control circuitry 38 are shown as hardware circuits in the example of FIG. 2, in other examples some of the functionality of this circuitry could be implemented instead by software executing on the CPUs 6 (e.g. a hypervisor). For example, while hardware circuitry 38 may be provided to perform the steps of FIGS. 7-9 for maintaining the tracking information 36 for a given VPEx (including maintaining/updating the pending interrupt record 60, coarse pending map 62, coarse enabled pending map 64 and pending interrupt status 66 as discussed above), the interrupt searching steps (including decisions based on tracking information 62, 64, 66 on whether it is necessary to search a given block 72 of the pending interrupt map 60) could be implemented in software. Hence, in some cases the CPU 6 would act as the interrupt circuitry 39 and (in part) the control circuitry 38.

Hence, in summary by tracking pending interrupt status using a state machine as discussed above, this can allow the interrupt search to be eliminated entirely in cases where it is already known that there will be no pending enabled interrupts for a given virtual processor. Also, by providing the coarse enabled pending map 64 this allows searches of particular blocks 72 within the pending interrupt map 60 to be eliminated to speed up the search process. Either way, this can improve the fraction of time spent processing the actual programs within a virtual processor and reduce the duration of the residency switching time when switching between virtual processors, to improve performance.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
an interrupt distributor circuitry to distribute virtual interrupts to one or more physical processors, each virtual interrupt to be handled by one of a plurality of virtual processors mappable to said one or more physical processors; and
control circuitry to maintain virtual processor interrupt tracking information corresponding to a given virtual processor, the virtual processor interrupt tracking information comprising:
a pending interrupt record indicative of which types of virtual interrupts are pending for the given virtual processor;
separate from the pending interrupt record, a pending interrupt status indication indicative of a pending interrupt status for the given virtual processor, said pending interrupt status indicative of whether the number of pending virtual interrupts for the given virtual processor is zero, in which the pending interrupt status indication indicates one of a plurality of states, the plurality of states including at least:
a pending enabled state indicating that there is at least one enabled pending interrupt for the given virtual processor, and
a pending disabled state indicating that one or more disabled pending interrupts are the only pending interrupts for the given virtual processor.

2. The apparatus according to claim 1, comprising interrupt search circuitry to perform an interrupt search in response to a search trigger event associated with the given virtual processor, the interrupt search comprising searching the pending interrupt record to identify pending interrupts to be handled by the given virtual processor.

3. The apparatus according to claim 2, in which:
in response to the search trigger event, when the pending interrupt status indication indicates that the number of pending interrupts to be handled by the given virtual processor is zero, the interrupt search circuitry is configured to suppress performing the interrupt search.

4. The apparatus according to claim 1, in which said pending interrupt status is indicative of whether the number of enabled pending virtual interrupts for the given virtual processor is zero.

5. The apparatus according to claim 4, comprising interrupt search circuitry to perform an interrupt search in response to a search trigger event associated with the given virtual processor, the interrupt search comprising searching the pending interrupt record to identify enabled pending interrupts to be handled by the given virtual processor; in which:
in response to the search trigger event, when the pending interrupt status indication indicates that the number of enabled pending interrupts to be handled by the given virtual processor is zero, the interrupt search circuitry is configured to suppress performing the interrupt search.

6. The apparatus according to claim 1, in which each virtual interrupt is associated with a corresponding memory address specified by a received message which triggered the virtual interrupt; and
the pending interrupt record is indicative of memory addresses corresponding to pending virtual interrupts to be handled by the given virtual processor.

7. The apparatus according to claim 1, in which the virtual processor interrupt tracking information also comprises:
a coarse enabled pending interrupt record to track, at a coarser granularity than the pending interrupt record, which groups of interrupt types include at least one interrupt type for which an enabled pending interrupt is to be handled by the given virtual processor.

8. The apparatus according to claim 7, comprising interrupt search circuitry to perform an interrupt search in response to a search trigger event, the interrupt search comprising searching the pending interrupt record to identify enabled pending interrupts to be handled by the given virtual processor, in which:

during the interrupt search, the interrupt search circuitry is configured to determine, based on the coarse enabled pending interrupt record, which portions of the pending interrupt record require searching.

9. The apparatus according to claim 8, in which the interrupt search circuitry is configured to suppress searching of a portion of the pending interrupt record corresponding to a group of interrupt types for which the coarse enabled pending interrupt record indicates that there are no enabled pending interrupts to be handled by the given virtual processor.

10. The apparatus according to claim 1, in which the virtual processor interrupt tracking information also comprises:

a coarse pending interrupt record to track, at a coarser granularity than the pending interrupt record, which groups of interrupt types include at least one interrupt type for which an enabled pending interrupt or disabled pending interrupt is to be handled by the given virtual processor.

11. The apparatus according to claim 1, in which the pending interrupt status indication indicates one of a plurality of states of a pending interrupt status state machine associated with the given virtual processor, and the control circuitry is responsive to events associated with the given virtual processor to trigger transitions between the plurality of states of the pending interrupt status state machine.

12. The apparatus according to claim 2, in which said pending interrupt status is indicative of whether an interrupt search is ongoing for the given virtual processor.

13. The apparatus according to claim 12, in which:

in response to detecting that, part way through performing the interrupt search for the given virtual processor, a further search trigger event has occurred for the given virtual processor and a new enabled interrupt has become pending for the given virtual processor since starting the interrupt search, the control circuitry is configured to update the pending interrupt status indication to indicate a re-search state.

14. The apparatus according to claim 13, in which in response to completing the interrupt search, when the pending interrupt status indication indicates the re-search state, the interrupt search circuitry is configured to re-start the interrupt search for the given virtual processor.

15. The apparatus according to claim 2, in which the search trigger event comprises a virtual processor residency change event indicating that the given virtual processor is to become resident on one of the physical processors.

16. The apparatus according to claim 1, in which the control circuitry has access to a plurality of sets of interrupt tracking information stored in a memory system, each set of interrupt tracking information corresponding to a respective virtual processor.

17. The apparatus according to claim 16, comprising a cache to cache at least a portion of the interrupt tracking information for at least a subset of the plurality of virtual processors; and the control circuitry is configured to maintain:
a cache pending interrupt status indication indicative of the pending interrupt status associated with a cached portion of the pending interrupt record for the given virtual processor cached in the cache; and
a memory pending interrupt status indication indicative of the pending interrupt status associated with a memory-based portion of the pending interrupt record for the given virtual processor stored in the memory system.

18. An apparatus comprising:

interrupt distributor circuitry to distribute virtual interrupts to one or more physical processors, each virtual interrupt to be handled by one of a plurality of virtual processors mappable to said one or more physical processors;

control circuitry to maintain virtual processor interrupt tracking information corresponding to a given virtual processor, the virtual processor interrupt tracking information comprising:

a pending interrupt record indicative of which types of virtual interrupts are pending for the given virtual processor;

separate from the pending interrupt record, a pending interrupt status indication indicative of a pending interrupt status for the given virtual processor, said pending interrupt status indicative of whether the number of pending virtual interrupts for the given virtual processor is zero; and a coarse enabled pending interrupt record to track, at a coarser granularity than the pending interrupt record, which groups of interrupt types include at least one interrupt type for which an enabled pending interrupt is to be handled by the given virtual processor; and interrupt search circuitry to perform an interrupt search in response to a search trigger event, the interrupt search comprising searching the pending interrupt record to identify enabled pending interrupts to be handled by the given virtual processor, in which:

during the interrupt search, the interrupt search circuitry is configured to determine, based on the coarse enabled pending interrupt record, which portions of the pending interrupt record require searching, and the interrupt search circuitry is configured to suppress searching of a portion of the pending interrupt record corresponding to a group of interrupt types for which the coarse enabled pending interrupt record indicates that there are no enabled pending interrupts to be handled by the given virtual processor.

19. An apparatus comprising:

interrupt distributor circuitry to distribute virtual interrupts to one or more physical processors, each virtual interrupt to be handled by one of a plurality of virtual processors mappable to said one or more physical processors;

control circuitry to maintain virtual processor interrupt tracking information corresponding to a given virtual processor, the virtual processor interrupt tracking information comprising:

a pending interrupt record indicative of which types of virtual interrupts are pending for the given virtual processor; and separate from the pending interrupt record, a pending interrupt status indication indicative of a pending interrupt status for the given virtual processor, said pending interrupt status indicative of whether the number of pending virtual interrupts for the given virtual processor is zero, in which the control circuitry has access to a plurality of sets of virtual processor interrupt tracking information stored in a memory system, each set of virtual processor interrupt tracking information corresponding to a respective virtual processor; and a cache to cache at least a portion of the interrupt tracking information for at least a subset of the plurality of virtual processors, in which the control circuitry is configured to maintain the pending interrupt status indication indicative of the pending interrupt status for the given virtual processor, the pending interrupt status being indicative of whether the number of pending virtual interrupts for the given virtual processor is zero, as:

a cache pending interrupt status indication indicative of the pending interrupt status associated with a cached portion of the pending interrupt record for the given virtual processor cached in the cache; and a memory pending interrupt status indication indicative of the pending interrupt status associated with a memory-based portion of the pending interrupt record for the given virtual processor stored in the memory system.

* * * * *